United States Patent [19]

Stolz

[11] Patent Number: 5,600,922
[45] Date of Patent: Feb. 11, 1997

[54] CONSTRUCTION FOR FASTENING A SHEET OF TRANSPARENT PLASTIC MATERIAL IN AN OPENING OF AN AWNING

[75] Inventor: Josef Stolz, Fulda, Germany

[73] Assignee: Mehler Vario System GmbH, Fulda, Germany

[21] Appl. No.: 209,813

[22] Filed: Mar. 11, 1994

[30]    Foreign Application Priority Data

Mar. 15, 1993 [EP]   European Pat. Off. .............. 93104173

[51] Int. Cl.$^6$ ................... B60J 1/18; E04B 7/16
[52] U.S. Cl. .................. 52/74; 52/538; 135/117; 296/107; 296/201; 296/146.14
[58] Field of Search ............... 52/202, 203, 63, 52/536, 538, 74; 135/91, 93–95, 117; 296/107, 201, 93, 90, 146.14, 201; 160/368.1

[56]    References Cited

U.S. PATENT DOCUMENTS

| | | | |
|---|---|---|---|
| 2,637,086 | 5/1953 | Phillips . | |
| 2,914,936 | 12/1959 | Reinold | 52/538 X |
| 4,372,014 | 2/1983 | Simpson | 52/536 X |
| 4,611,849 | 9/1986 | Tremkler | 296/201 |
| 4,874,201 | 10/1989 | Scaglietti | 296/201 |
| 5,040,844 | 8/1991 | Stolz . | |
| 5,163,785 | 11/1992 | Zanelli et al. | 405/284 X |
| 5,271,655 | 12/1993 | Ball et al. | 296/107 X |

FOREIGN PATENT DOCUMENTS

| | | | |
|---|---|---|---|
| 0284931 | 10/1988 | European Pat. Off. | 296/146.14 |
| 0345799 | 12/1989 | European Pat. Off. . | |
| 3841035 | 6/1990 | Germany . | |

*Primary Examiner*—Carl D. Friedman
*Assistant Examiner*—Winnie Yip
*Attorney, Agent, or Firm*—Panitch Schwarze Jacobs & Nadel, P.C.

[57]    ABSTRACT

A construction for fastening a sheet of transparent plastic material, such as a window, in an opening of an awning has a separable slide fastener to keep the window in place, while two elongated sealing elements in the form of profile pipings, having a matching profile functioning as a snap-on mounting, are used to provide for a separable waterproof joint.

8 Claims, 1 Drawing Sheet ns for fastening a sheet of transparent plastic material in an opening of an awning, and more particularly to a construction for fastening a window in a convertible canopy top, as known for sports cars, in a readily detachable and replaceable, yet waterproof, manner.

CONSTRUCTION FOR FASTENING A SHEET OF TRANSPARENT PLASTIC MATERIAL IN AN OPENING OF AN AWNING

FIELD OF THE INVENTION

The present invention generally relates to a construction for fastening a sheet of transparent plastic material in an opening of an awning, and more particularly to a construction for fastening a window in a convertible canopy top, as known for sports cars, in a readily detachable and replaceable, yet waterproof, manner.

BACKGROUND OF THE INVENTION

Arrangements for fixing a sheet of transparent plastic material in an opening of an awning are well-known in the art. In most cases the sheet of transparent plastic material forms a window, e.g. in a tent awning or in a convertible canopy top.

It is a problem, particularly in convertible canopy tops, that the awning cloth is more durable and sturdier than the transparent plastic material used for the window-forming part of the convertible top, the window allowing the driver to monitor the traffic behind him. The fact that the awning cloth is still in an acceptable condition when the transparent plastic material, used for the rear window of a canopy top, is worn out is mainly caused by the sensitivity of the transparent plastic material to UV-radiation. UV-rays emitted by the sun cause aging of the plastic material which becomes brittle long before the canvas or other material used for the awning cloth loses its characteristic properties. A consequence is that the brittle plastic material cracks or ruptures under tensioning of the material when it is stretched by the rods or poles of the spanning construction of the convertible top.

Another reason that the rear window of a convertible top becomes worn out or blinded long before the canvas of the awning has to be replaced is that dust or sand causes scratches on the plastic material. The scratches interrupt and disperse light beams, thereby rendering the window blind (translucent or opaque) rather than transparent and clear, and thus hampering the rear view of the driver.

DESCRIPTION OF THE PRIOR ART

Due to these circumstances, different arrangements have been suggested in the past to fasten a sheet of transparent plastic material as a window in an opening of an awning in a manner that provides a waterproof joint, while making replacement of a worn-out window feasible in a convenient manner, i.e. fastening a sheet-like window of plastic material in a readily detachable manner without sacrificing watertightness of the convertible top.

In German publication DE-OS-3 841 035 A1, applicants have disclosed a construction for fixing a window in a convertible canopy top. In this known arrangement, the two parts of a slide fastener are fixed by glue either to the window or to the awning cloth. This fastener is used to keep the window in place, while a hot-melt adhesive is used to glue an overlapping portion of the awning to the window in the form of a plastic sheet to provide for a waterproof joint. In order to melt the hot-melt adhesive, a wire used as an electric resistance heating element is positioned between the two overlapping portions of the waterproof joint, the two ends of the wire being accessible in order to conduct an electric current through the wire. In the event that replacement of a scratched or aged window is necessary, the hot-melt adhesive is melted by means of heat produced with the wire heating element, and the slide fastener is opened.

It proves to be a drawback of this system that, in order to produce an adhesive joint which is aesthetically satisfying as well, a press-frame is necessary to press the overlapping portions together in a direction perpendicular to the plane of the window and to keep the portions of the head-joint or lap-joint in place until the hot-melt adhesive resolidifies. The necessary frame causes a ponderous replacement procedure.

Furthermore, applicants suggested the use of a separable type water-resistant slide fastener as a means to link the window to the awning cloth. This idea is disclosed in German Utility Model G 92 03 530.2. A water-resistant slide fastener is also known, e.g., from EP-A 0 345 799 A1. This solution proved not to be very favorable because water-resistant slide fasteners are comparatively expensive. Moreover, the slide fastener must be fixed in the vicinity of the joint between the edge of the window and the opening of the awning. It proved to be very difficult to attach the separable halves of a water-resistant slide fastener to the window on the one hand and the awning on the other hand in a way that the visible joint would not be deformed under tension in a wave-like form. The wave-like distortion or deformation of the joint is not acceptable from an aesthetic viewpoint for convertible canopy tops for exclusive sports cars.

SUMMARY OF THE INVENTION

It is therefore an object of the present invention to provide a new construction for fastening a sheet of transparent plastic material in an opening of an awning, the construction allowing a convertible canopy top or the like to be produced in a feasible and inexpensive manner, and the construction further allowing easy detachment and replacement of the plastic window without sacrificing watertightness of the convertible top, tent or the like.

The inventive construction is characterized in that a first part of a slide fastener and a first elongated sealing element are fixed on a circumferential edge of the plastic sheet, and a second part of the slide fastener and a second elongated sealing element are fixed on a circumferential edge of the opening of the awning, whereby in the mounted (fastened) state of the plastic sheet the first and second sealing elements form a separable waterproof joint.

Preferably, the construction of the slide fastener and the sealing element is such that the first part of the slide fastener is attached to an outer circumference of the plastic sheet and the first sealing element is attached to an inner circumference of the plastic sheet, that the second sealing element is attached to an inner circumference of the opening in the awning and the second part of the slide fastener is attached to an outer circumference of the opening, and that the distance between the second sealing element and the second part of the slide fastener, both of which are fixed to the awning cloth, is slightly larger than the distance between the first sealing element and the first part of the slide fastener, both of which are fixed to the plastic sheet. This preferred embodiment of a construction according to the invention is advantageous in that any stress or tension induced in the awning and the plastic is transmitted to the slide fastener. In the mounted state, the first and second sealing elements, forming a separable waterproof joint, are maintained free of stress. This means that the two sealing elements, which are preferably profile pipings having a matching profile functioning as a snap-on mounting, cannot be torn apart and do not leak because of induced forces.

In a preferred embodiment of the invention the profile pipings have serpentine matching profiles engaging with each other in a mounted state. Profile pipings of the mentioned kind are easy to manufacture (e.g., by plastic extrusion or molding) and can be snapped together, thereby providing a waterproof joint at low cost. After unzipping the slide fastener they can be easily disengaged, thereby releasing the window to be replaced.

According to the invention a preferred embodiment is further characterized in that the first sealing element is fixed to the outside of the plastic sheet, the first part of the slide fastener is fixed to the inside of the sheet, and the second sealing element and the second part of the slide fastener are fixed to the inside of the awning. In this manner the opening of the awning and therefore the area of the plastic sheet that can actually be used as a rear window or the like is maximized, or in other words the lost edge area needed for attaching the first part of the slide fastener and the first sealing element to the plastic sheet is minimized.

In a preferred embodiment of a construction according to the invention the parts of the slide fastener and the sealing elements are fixed to the plastic sheet and the awning cloth, respectively, by means of glue. By using glue the manufacturing procedure is further simplified.

Alternatively, the inner edge of the opening can be crimped over in a direction towards the plastic sheet and the crimped-over part and the main part of the awning can be sewn together, thereby providing a neat and durable visible edge.

BRIEF DESCRIPTION OF THE DRAWINGS

The foregoing summary, as well as the following detailed description of a preferred embodiment of the invention, will be better understood when read in conjunction with the appended drawing. For the purpose of illustrating the invention, there is shown in the drawing an embodiment which is presently preferred. It should be understood, however, that the invention is not limited to the precise arrangements and instrumentalities shown. In the drawing:

The only figure is a cross-sectional view of a construction according to the invention.

DETAILED DESCRIPTION OF A PREFERRED EMBODIMENT OF THE INVENTION

Figure 1:
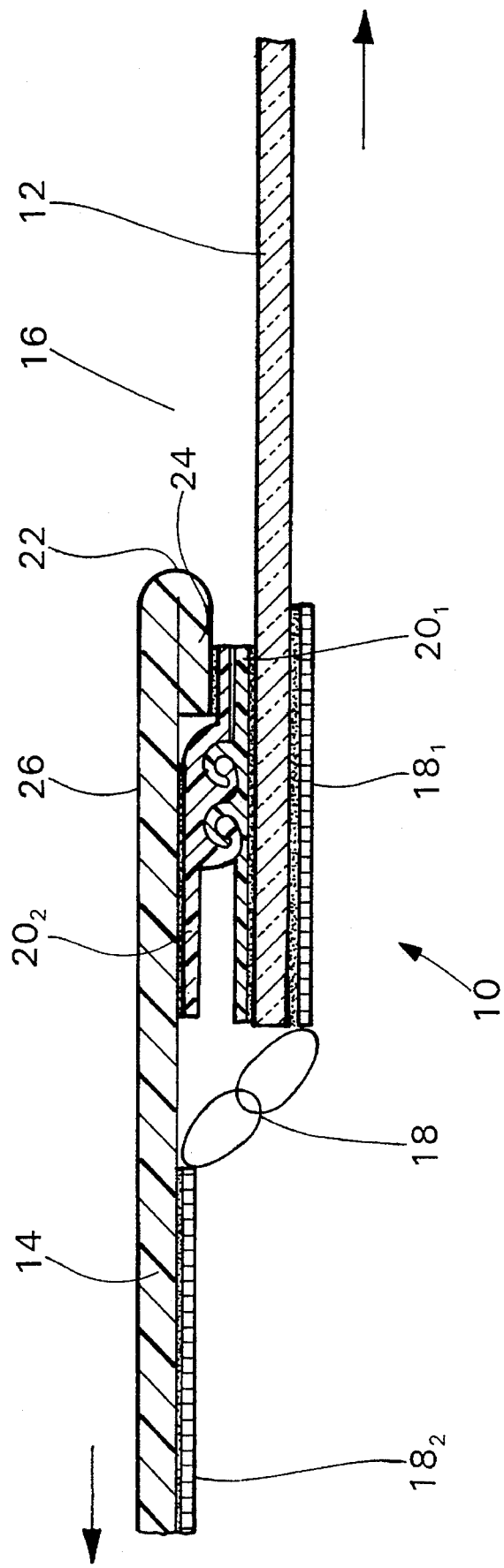

Referring now to the drawings, and more particularly to the only figure, there is shown a construction 10 according to the invention which secures a plastic sheet-like window 12 to an awning cloth 14. In the drawing only one circumferential edge of an opening 16 in the awning 14 is shown, but it should be obvious for the person skilled in the art that the invention is preferably carried out using the inventive construction on the whole circumference of an opening, the latter having a preferably rectangular shape.

The slide fastener 18 consists of a first part $18_1$ which is attached by means of glue or the like to the inner side of the plastic sheet forming the window 12, whereby "inner side" is defined in reference to the inside of a car, for example, and a second part $18_2$ which is attached by means of glue or the like to the inner side of the awning 14. A first sealing element in the form of a profile piping $20_1$ is attached by means of glue or the like to the outer side of the plastic sheet 12, whereby the sealing element is disposed on a circumference which is narrower, i.e. forms an inner circumference compared to the circumference or other edge of the first part $18_1$ of the separable slide fastener. A second sealing element $20_2$ is attached to the inner side of the awning. With respect to the opening 16 of the awning, the sealing element $20_2$ is arranged on an inner circumference compared to the circumference on which the second part $18_2$ of the slide fastener 18 is arranged.

In comparison to the distance between the first part $18_1$ of the slide fastener and the first sealing element $20_1$ which are both attached to the sturdier and more rigid plastic material of the window 12, the distance between the second part $18_2$ of the slide fastener 18 and the second sealing element $20_2$, which are both attached to the relative soft canvas or the like of the awning, is chosen so that tension induced into the whole arrangement by spanning struts or the like results in forces in the slide fastener 18, but not in forces in the two sealing elements $20_1$ and $20_2$. The two sealing elements are snapped together and form a watertight joint. Preferably they have a serpentine configuration as shown in the only figure of the drawings, engaging with each other in mounted state.

The inner edge 22 of the opening 16 of the awning 14 is crimped-over, as shown in the drawing, and the crimped-over part 24 is sewn by means of a seam, indicated by the dash line, to the main part 26 of the awning.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. A construction (10) for fastening a sheet of transparent plastic material (12) in an opening (16) of an awning (14) in a readily detachable and replaceable yet waterproof manner, comprising a first part ($18_1$) of a slide fastener (18) and a first elongated sealing element ($20_1$) fixed on a circumferential edge of said plastic sheet, and a second part ($18_2$) of said slide fastener (18) and a second elongated sealing element ($20_2$) fixed on a circumferential edge of said awning, whereby when said plastic sheet is fastened in said opening of said awning, said first and second sealing elements overlapping and attaching to each other to form a stress-free and separable waterproof joint between the plastic sheet and the awning, and attachment of the first and second parts of said slide fastener provides a path for transferring forces between the plastic sheet and the awning.

2. A construction (10) according to claim 1, wherein said first part ($18_1$) of said slide fastener (18) is attached to said circumferential edge of said plastic sheet (12) at a location which is closer to the circumferential edge than and said first sealing element ($20_1$), said second sealing element ($20_2$) is attached to the circumferential edge of said awning around said opening (16) at a location which is closer to the circumferential edge than said second part ($18_2$) of said slide fastener (18), and said second sealing element and said part of said slide fastener, both of which are fixed to said awning, are spaced apart at a distance which is slightly larger than a spacing distance between said first sealing element and said slide fastener, both of which are fixed to said plastic sheet, whereby any stress induced in the awning and the plastic sheet is transmitted to the slide fastener, such that said first and second sealing elements form a stress-free, separable waterproof joint.

3. A construction according to claim 2, wherein said first ($20_1$) and said second sealing elements ($20_2$) are profile pipings having a matching profile which function as a snap-on mounting.

4. A construction according to claim 3, wherein said profile pipings ($20_1$, $20_2$) having serpentine matching profiles engaging with each other in a mounted state.

5. A construction according to claim 2, wherein said first sealing element ($20_1$) is fixed to the outside of said plastic sheet (12), said first part ($18_1$) of said slide fastener is fixed to the inside of said sheet, and said second sealing element ($20_2$) and said second part ($18_2$) of said slide fastener are fixed to the inside of said awning (14).

6. A construction according to claim 5, wherein said parts of said slide fastener and said sealing element are fixed to said plastic sheet and said awning cloth, respectively, by means of glue.

7. A construction according to claim 2, wherein said circumferential edge of said awning (16) includes an inner edge portion (22) around said opening (16), wherein said inner edge portion is crimped-over in a direction towards the plastic sheet (12) and said crimped-over portion (24) and a main part (26) of said awning are sewn together.

8. A construction according to claim 1, wherein the awning is a convertible canopy top and the transparent plastic material forms a window therein.

\* \* \* \* \*